United States Patent
Barnett, Jr. et al.

(10) Patent No.: US 9,154,810 B2
(45) Date of Patent: Oct. 6, 2015

(54) IN-HOME DISTRIBUTION RESIDENTIAL GATEWAY AND/OR SET TOP BOX

(75) Inventors: Thomas C. Barnett, Jr., Atchison, KS (US); Steven E. Kozisek, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 954 days.

(21) Appl. No.: 12/489,009

(22) Filed: Jun. 22, 2009

(65) Prior Publication Data
US 2010/0325672 A1    Dec. 23, 2010

(51) Int. Cl.
| | |
|---|---|
| *H04N 7/18* | (2006.01) |
| *H04N 21/214* | (2011.01) |
| *H04N 21/21* | (2011.01) |
| *H04N 21/226* | (2011.01) |
| *H04N 21/239* | (2011.01) |
| *H04N 21/422* | (2011.01) |
| *H04N 21/637* | (2011.01) |
| *H04N 21/6377* | (2011.01) |
| *H04N 5/44* | (2011.01) |
| *H04N 7/10* | (2006.01) |

(52) U.S. Cl.
CPC .......... *H04N 21/2143* (2013.01); *H04N 5/4403* (2013.01); *H04N 7/10* (2013.01); *H04N 21/21* (2013.01); *H04N 21/214* (2013.01); *H04N 21/226* (2013.01); *H04N 21/239* (2013.01); *H04N 21/42204* (2013.01); *H04N 21/637* (2013.01); *H04N 21/6377* (2013.01)

(58) Field of Classification Search
CPC .......... H04N 2005/4403; H04N 21/21; H04N 21/214; H04N 21/2143; H04N 21/226; H04N 21/239; H04N 21/42204; H04N 21/637; H04N 21/6377; H04N 5/4403
USPC .......................................... 725/81, 74, 78, 82
See application file for complete search history.

(56) References Cited

U.S. PATENT DOCUMENTS

| | | | |
|---|---|---|---|
| 5,638,112 A | 6/1997 | Bestler et al. | |
| 5,818,438 A | 10/1998 | Howe et al. | |
| 5,935,232 A * | 8/1999 | Lambrecht et al. | 710/315 |
| 6,768,722 B1 | 7/2004 | Katseff et al. | |
| 7,346,917 B2 * | 3/2008 | Gatto et al. | 725/5 |
| 2004/0006772 A1 * | 1/2004 | Ansari et al. | 725/120 |
| 2005/0097612 A1 * | 5/2005 | Pearson et al. | 725/82 |
| 2006/0063490 A1 * | 3/2006 | Bader et al. | 455/45 |
| 2007/0037522 A1 * | 2/2007 | Liu et al. | 455/68 |
| 2008/0170130 A1 * | 7/2008 | Ollila et al. | 348/211.99 |
| 2008/0250462 A1 * | 10/2008 | Crohas | 725/74 |

* cited by examiner

*Primary Examiner* — Jeremy Duffield
(74) *Attorney, Agent, or Firm* — Swanson & Bratschun, L.L.C.

(57) ABSTRACT

A multimedia residential gateway device for providing video services to multiple televisions within a home. The device receives incoming video content from a DSL, DOCSIS, or Ethernet data stream and outputs selected content to individual televisions, with the content for each television being transmitted over an ATSC or NTSC channel associated with each television. This eliminates the need for multiple set top boxes in a high-definition offering. Radio frequency handheld remotes for each television are provided which communicate directly with the gateway device. The device may also be provided as a multi-television set top box, wherein the device receives Ethernet data streams from a customer's existing residential gateway.

28 Claims, 3 Drawing Sheets

IN-HOME DISTRIBUTION RESIDENTIAL GATEWAY AND/OR SET TOP BOX

TECHNICAL FIELD OF THE INVENTION

The present disclosure relates generally to delivery of in-home voice, video and data services, and in particular, to device for distributing in-home video services to multiple televisions.

BACKGROUND OF THE INVENTION

In recent years, many companies have started to offer in-home digital video services to their customers using packet-switched transmission technologies such as internet protocol television (IPTV). These new video services and associated hardware require "upstream" communication for certain functionality, such as video on demand (VOD), web browsing, and other interactive features. In addition, these digital video services are increasingly being offered as part of a package with internet data and phone services using a single hardware platform. One obstacle to the sales and installation of such services is the requirement for additional hardware, such as digital television set top boxes, and the need for upgraded cabling throughout the home to reach the individual set top boxes.

In a typical installation, a device known as a residential gateway is installed in the home for communicating with the upstream provider equipment. The residential gateway is then connected to individual set top boxes throughout the home, with a separate set top box installed near and connected to each television being used. The set top boxes are needed to convert the Ethernet 802.3 packet-based video signals from the residential gateway into a format that can be interpreted by the television, such as Advanced Television Systems Committee (ATSC) signals. In order to connect the residential gateway to the set top boxes, however, Ethernet Category 5 (CAT-5) cabling must be run from the residential gateway to each room where a set top box and television is to be located. Since most homes do not have existing Ethernet CAT-5 cabling already installed, the labor and material cost of adding such cabling, in addition to the cost of the individual set top boxes, can be quite high.

An alternative solution known in the art is to communicate the gateway Ethernet signals over the existing coaxial cabling in the home using a "Ethernet over coax" protocol, such as the Home Phoneline Networking Alliance (HPNA) or Multimedia Over Coax Alliance (MOCA) protocol, but this solution often proves unsatisfactory since the existing coaxial cable connectors, or perhaps entire cable runs, may need to be upgraded to accommodate the higher frequencies of the Ethernet signals. This solution also still requires a technician to come to the home, as most customers are not capable of performing and troubleshooting the required wiring upgrades themselves.

SUMMARY OF THE INVENTION

Accordingly, in one aspect, a device for providing digital video signals to multiple televisions within a customer building is disclosed, comprising a network module for receiving a packet-based data stream containing a plurality of digital video streams, a processing module for extracting the digital video channel streams from the packet-based data stream, and an RF modulation module for converting the digital video streams into a plurality of RF modulated channel signals. The device is configured to transmit the plurality of RF modulated channel signals to at least one of the televisions within a customer building. Each of the televisions may be tuned to receive at least one of the RF modulated channel signals. The RF modulated channel signals may be transmitted to the televisions over the air or over a coaxial cable system and may be formatted in a variety of formats, including ATSC, NTSC (National Television System Committee) and PAL (Phase Alternating Line) formats.

In another aspect, a method for providing digital video services to a plurality of televisions in a customer building is disclosed, comprising the steps of receiving a packet-based data stream into a multimedia gateway, the packet-based data stream including a plurality of digital video streams, extracting a first digital video stream from the packet-based data stream, converting the first digital video stream into a first RF modulated channel signal, and transmitting the first RF modulated channel signal from the multimedia gateway to a television in the customer building. Additional digital video streams may be extracted from the packet-based data stream and transmitted to other televisions using different channel frequencies, with each television in the building tuned to one or more channels.

In another aspect, a method for providing digital video services to a plurality of televisions in a customer building is disclosed, comprising the steps of receiving a packet-based data stream into a set top box, the packet-based data stream including a plurality of video content streams, extracting a first video content stream from the packet-based data stream, converting the first video content stream into an RF modulated channel signal, and transmitting the RF modulated channel signal from the set top box to a television in the customer building. Additional digital video streams may be extracted from the packet-based data stream and transmitted to other televisions using different channel frequencies, with each television in the building tuned to one or more channels.

DETAILED DESCRIPTION OF THE PREFERRED EMBODIMENTS

Figure 1:
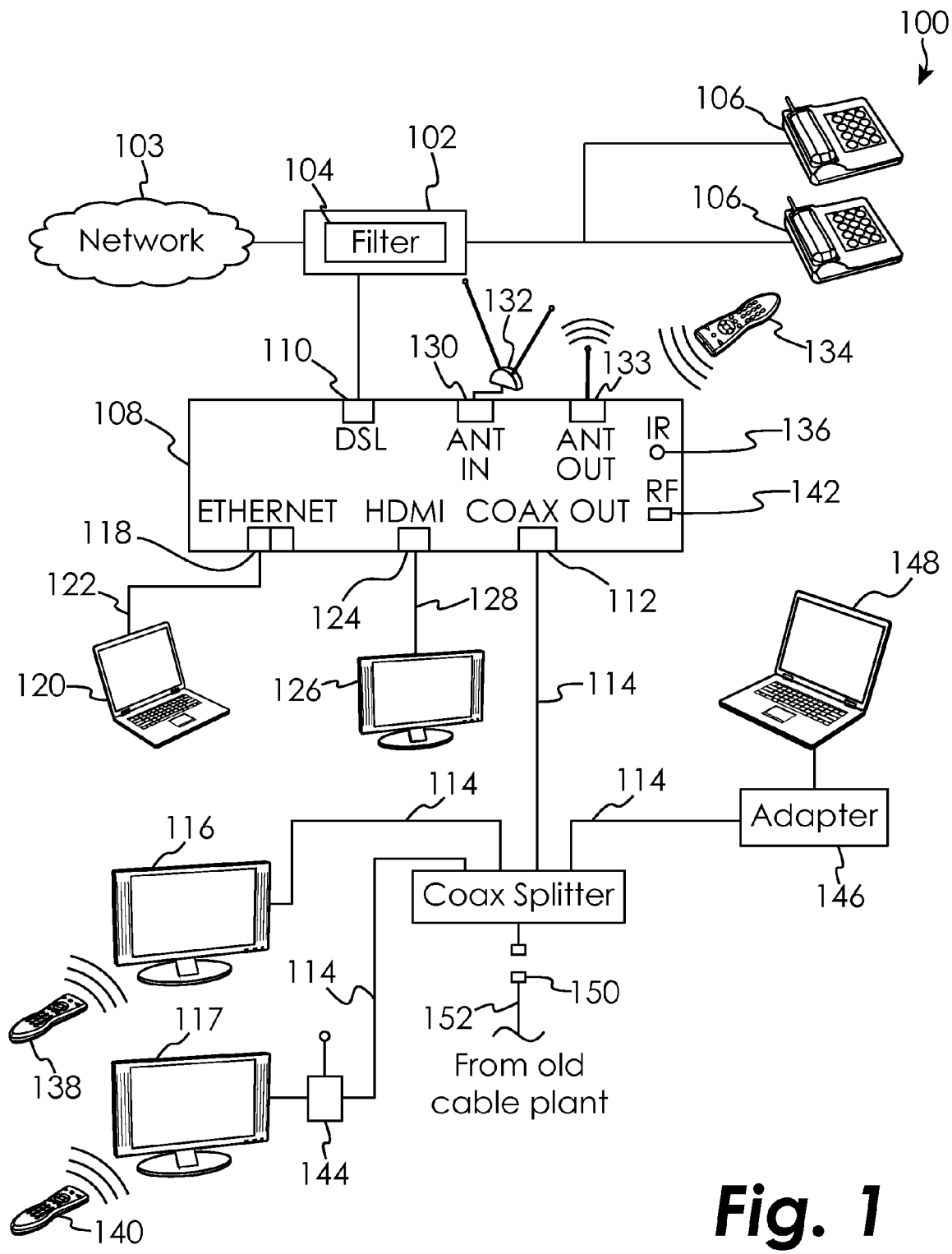
FIG. 1 is an exemplary system configured to provide digital video programming to multiple televisions within a building according to one embodiment of the present disclosure.

For the purposes of promoting an understanding of the principles of the invention, reference will now be made to embodiments illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

FIG. 1 is an illustration of an exemplary system 100 configured to provide digital video services to multiple locations within a customer home or other building. As shown, a network interface device 102 is connected to the provider network 103 and receives an incoming provider signal which contains both "plain old telephone system" (POTS) voice signals, which are generally below 4 kHz, and a higher frequency broadband data component, such as a digital subscriber line (DSL) signal or a data over cable service interface specification (DOCSIS) signal, which is generally well above 25 kHz. In addition to internet browsing traffic data, the broadband data component contains IPTV programming content. The network interface device 102 comprises a frequency filter 104 which separates the POTS signals from the broadband signals. The POTS output of the filter 104 is connected to analog phones 106 within the building and the broadband output of the filter 104 is connected to a multimedia gateway 108 which acts as both an internet services gateway and a multi-television set top box for IPTV services.

The multimedia gateway 108 receives the DSL data stream at port 110 and performs processing to extract individual IPTV channel signals from the broadband stream. The multimedia gateway includes coaxial output port 112 which is connected to the existing coaxial wiring lines 114 in the customer home or other building. The coaxial lines 114 connect to the individual remotely located televisions 116 and 117 in the home. The multimedia gateway further comprises Ethernet ports 118 for connecting the gateway 108 to Ethernet devices (i.e., computer 120) in the home via CAT-5 cabling 122, and High-Definition Multimedia Interface (HDMI) port 124 for connecting a nearby television 126 to the gateway 108 via HDMI cable 128. In addition, the gateway 108 may include a coaxial antenna port 130 for receiving off-air signals from antenna 132, including NTSC and ATSC public broadcast channels. The gateway 108 may also include a transmitter output 133 for transmitting a short-range ATSC or NTSC over-the-air signal to televisions 116 and 117.

A handheld infrared (IR) remote 134 is provided which allows the user to select content to be displayed on nearby television 126. The signals output by handheld IR remote 134 are received by the multimedia gateway via IR sensor 136. Handheld radio frequency (RF) remotes 138 and 140 are provided which allow the user to select content to be displayed on remotely located televisions 116 and 117, respectively. The signals output by handheld RF remotes 138 and 140 are normally able to pass through walls in a home and be received by an RF antenna 142 contained within or connected to the outside of multimedia gateway 108. However, if the distance and number of walls between a remotely located television 117 and the multimedia gateway 108 is too great for the signals from handheld RF remote 138 or 140 to reach the multimedia gateway, a remote RF repeater 144 may be mounted in-line with the cable 114 near the television 117. The remote RF repeater 144 receives the signals from handheld remote 140 and retransmits them over the cable lines 114 to the gateway 108.

In certain embodiments, the multimedia gateway 108 will output an "Ethernet over coax" signal, using a protocol such as HPNA or MOCA, at coaxial output 112 while simultaneously outputting the ATSC signals. Adapter 146 may be provided to convert the HPNA or MOCA signals back to an 802.3 Ethernet signal which can be received by computer 148. A 75 ohm termination resistor 150 may be provided to terminate the incoming coaxial cable line feed 152 from a previous service provider if the customer is switching from a traditional cable television service to an IPTV service.

Figure 2:
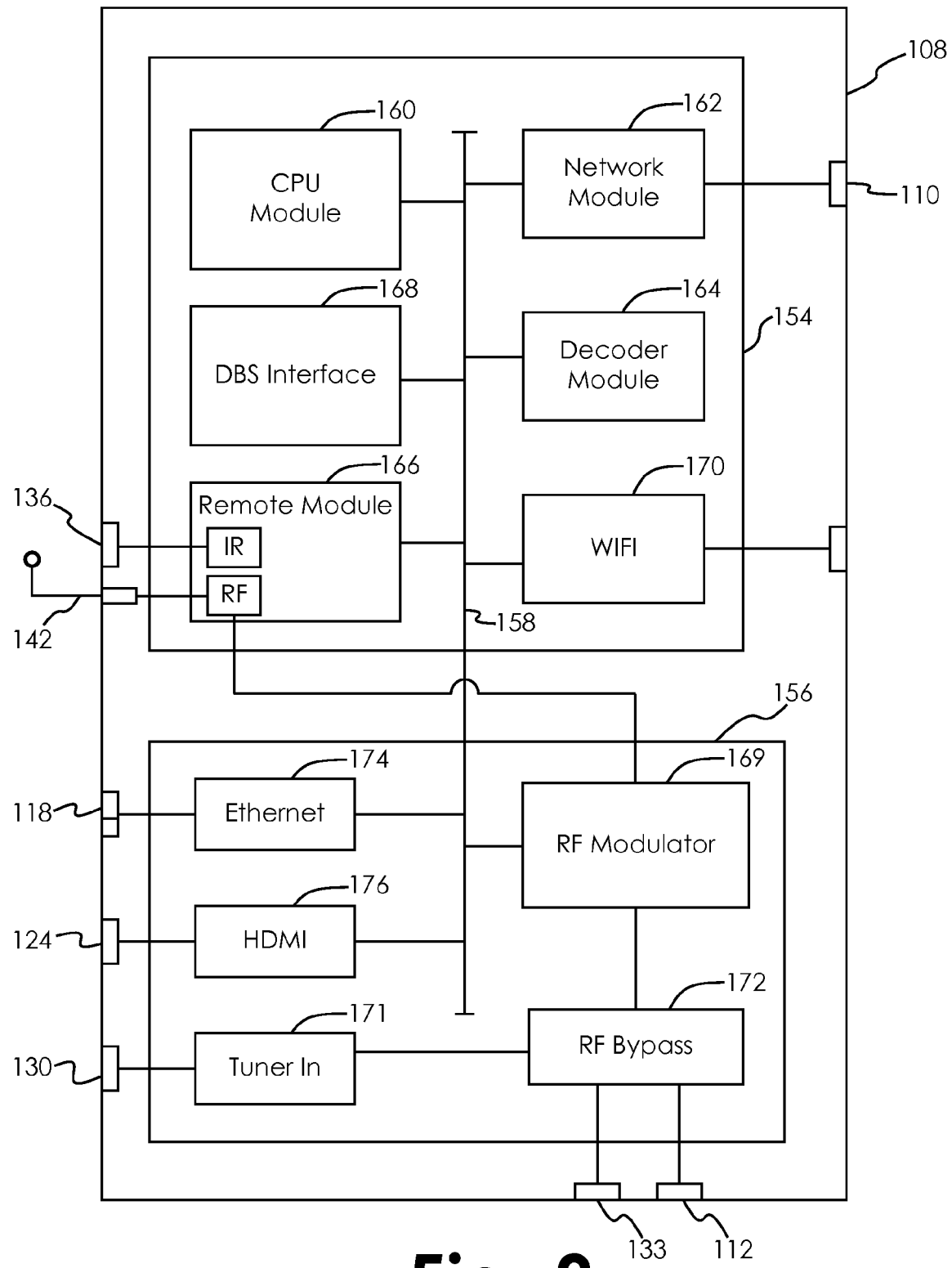
FIG. 2 is schematic block diagram of a multimedia gateway according to one aspect of the present disclosure.

FIG. 2 illustrates a schematic block diagram of the multimedia gateway 108 according to one embodiment of the present disclosure. Multimedia gateway 108 comprises a digital system section 154 and a media interface section 156. A system bus 158 is configured to connect the various components within the multimedia gateway 108.

Digital system section 154 comprises a main central processing unit (CPU) module 160, a network module 162, an audio-video decoding module 164, and a remote control module 166. A digital broadcast satellite (DBS) module 168 and/or a wireless local area network (LAN) module 170 may optionally be provided within digital system section 154. It shall be understood that each of the modules 160, 162, 164 and 166 may contain both the physical interface hardware and software to implement the required functionality. Each of the modules 160, 162, 164 and 166 may also be located on different physical chips, in combination on a single "System On a Chip" (SOC), or in various sub-combinations of chips.

The main CPU module 160 maintains the operational software and BIOS firmware required to operate the multimedia gateway 108. The main CPU module 160 also manages the internet protocol television (IPTV) middleware applications, user interface applications (such as on-screen movie selections or online banking), and digital rights management (DRM) applications.

The network module 162 contains the necessary components to receive the incoming broadband data signal, via a CAT5 cable (in the case of DSL) or a coaxial cable (in the case of DOCSIS). The network module 162 is configured to extract and synchronize the encrypted IPTV video packet streams being sent from various IP addresses (with each incoming IPTV channel normally assigned a specific address/port) and pass them to the audio-video decoding module 164. It shall be understood that the network module 162 may be configured to receive various types of broadband data formats including, but not limited to, those implemented within the DSL, asynchronous DSL (ADSL), very high bit rate DSL (VDSL), VDSL2, DOCSIS2, DOCSIS3, OpenCable Application Platform (OCAP), Tru2Way and other broadband delivery protocols known in the art. The network module may also be configured to implement pair bonding when connected to a two-pair telephone cable. The audio-video decoding module 164, in conjunction with the appropriate digital rights management software, is configured to decode the encrypted video information for each channel being watched on a particular television and supply it to the media interface section 156. Preferably, the video information received by the audio-video decoding module is an encrypted H.264/MPEG4 or MPEG2 standard signal (in the case of IPTV), although other digital video formats may be utilized, including, but not limited to, those formats implemented within the DOCSIS2 or DOCSIS3, OCAP or Tru2Way protocols.

The remote control module 166 receives commands from the IR and RF handheld remotes 134, 138, 140 via IR sensor 136 and RF antenna 142. If the RF repeater unit 144 is being utilized as described hereinabove, the RF remote commands will be received via coaxial port 112 and routed to the remote control module 166.

The media interface section 156 comprises an RF modulation module 169, an optional ATSC tuner module 171, and an optional RF bypass module 172. Ethernet module 174 and HDMI interface module 176 may also be optionally provided within the media interface section 156.

The RF modulation module 169 is configured to receive the decoded video signals from the audio-video decoding module 164 and convert them to an RF modulated format, such as ATSC, NTSC, or PAL signals to name just a few non-limiting examples. The RF modulation module 169 is capable of outputting a plurality of RF modulated signals over the existing home coaxial cables to televisions in separate rooms. For example, a first video program for a first remotely-located digital television 116 can be output on a first ATSC channel, a second video program for a second remotely located digital television can be output on a second ATSC channel, and a third video program for a remotely located analog television 117 can be output on a NTSC channel for to an analog television (not shown). Each television will be tuned to an assigned ATSC or NTSC channel. When the user selects a particular IPTV channel (i.e., ESPN or Comedy Central) using a handheld remote, the multimedia gateway 108 will output the program over the ATSC or NTSC channel assigned to the television associated with that handheld remote. In certain embodiments, the RF modulated signals may also be output over the air from the gateway 108 to the televisions 116 and 117 via transmitter output 133.

The optional ATSC tuner module 171 and the RF modulation module 169 are connected to the RF bypass module 172 so that the user can bypass the provider IPTV television signal and instead receive off-air broadcast signals on a given television. If there is a television that is located very close to the multimedia gateway 108, that television can be connected directly to the HDMI module 176 through port 124 to receive video content. It shall be understood that other connections may be provided to supply an audio or video signal to the nearby television including, but not limited to, $YP_bP_r$ Component Video, Composite Video, or S-Video connections.

Ethernet module 174 is configured to send and receive 802.3 Ethernet protocol signals to and from other devices in the home, such as personal computers, IP phones, or any other devices requiring an internet connection. In a preferred embodiment, the Ethernet module 174 is connected to a CAT-5 cable, and may be further connected to other in-home networking devices, such as Ethernet bridges or routers. In other embodiments, the Ethernet module 174 may output Ethernet signals over the existing home coaxial cables using the HPNA or MOCA protocols.

Each of the modules within the digital system section 154 and media interface section 156 may include various processors which execute software, such as one or more PENTIUM or DUAL-CORE processors supplied by INTEL Corporation of 2200 Mission College Boulevard, Santa Clara, Calif. 95052, USA. The software, depending on the system functionality, may be configured to store and (i) manage information, such as audio/video content, (ii) manage routing of audio/video streams, and/or (iii) manage interaction with an end-user to download audio/video content and images for display on a television 116,117,126.

Main CPU module 160 may further include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

The setup and operation of the multimedia gateway 108 will now be described. After the multimedia gateway 108 is installed and connected to the existing home coaxial cable system, each television (except for the television close to the multimedia gateway 108) will need to be tuned to a predetermined ATSC or NTSC channel. For example, a first remote television may be tuned to ATSC channel 9.1, a second remote television to ATSC channel 10.2, and a third remote television to NTSC channel 3. The user (or installer) then configures the multimedia gateway 108 to associate the handheld remote for each remote television with the assigned channel for that television. The television closest to the multimedia gateway 108 is preferably connected with the HDMI port of the multimedia gateway 108 and associated with the handheld IR remote 134.

When the user wishes to view programs on a remote television 116,117, he uses the RF handheld remote 138,140 associated with the particular television. The RF signals output by the handheld RF remote 138,140 are received by the remote control module 166 within multimedia gateway 108. The multimedia gateway 108 then sends a request for the selected content (i.e., ESPN) to the provider network 103 via the network module 162. The provider upstream equipment (not shown), then begins transmitting encrypted IPTV MPEG video data packets containing the requested content to the multimedia gateway 108. It shall be understood that the video data packets may also be in the form of other formats, including DOCSIS or Tru2Way, as described hereinabove.

The network module 162 separates and synchronizes the requested MPEG content data packets from the broadband data stream and passes them to the audio-video decoding module 164. It shall be appreciated that the video content packets may be routed from the network module to other components within the multimedia gateway 108, such as CPU module 160, before being directed to the audio-video decoding module 164 or other modules within the multimedia gateway 108. Using the corresponding digital rights management keys (based on the customer subscription), the audio-video decoding module 164 decodes the encrypted packets into an appropriate format, such as S-Video, ATSC, NTSC, $YP_bP_r$ Component Video, Composite Video, or HDMI and directs them to the RF modulation module 169.

The RF modulation module 169 receives the video signal from the audio-video decoding module 164 and converts the signal to an RF modulated signal at a frequency or channel (i.e., an ATSC or NTSC channel) associated with the requesting handheld remote and television. If the signal sent from the audio-video decoding module 164 to the RF modulation module 169 is already in an ATSC, NTSC, or PAL format, the RF modulation module simply modulates the signal on the appropriate channel frequency for a given television and outputs the signal via the coaxial output port 112 or transmitter output 133. If the signal sent from the audio-video decoding module 164 to the RF modulation module 169 is in another format, such as MPEG2, MPEG4, S-video, HDMI, Composite Video or Video/Audio Micro-code, the RF modulation module 169 will first convert the signal to an ATSC, NTSC, or PAL format (or other appropriate format for the receiving television) before the RF modulation is applied. The RF modulated signal is then output through the existing coaxial cabling via coaxial output port 112 (or over the air via transmitter output 133) to the television associated with the requesting handheld remote. If the user selects a new program channel (i.e., switches from ESPN to Comedy Central) using the same handheld remote, the new program channel will be transmitted to the associated television over the same channel. In other words, the multimedia gateway 108 will always transmit video content to a given television using the same channel, no matter what program content the user has selected.

The above process will be repeated for other RF handheld remotes and associated televisions in the house, with multimedia gateway 108 transmitting the selected content over the frequency or channel associated with the given television and handheld remote. In this way, the need for a separate set top box for each television is eliminated. Furthermore, the compatibility of the ATSC signals with typical coaxial home wiring simplifies the installation process and possibly eliminates the need for a technician to install the equipment.

Figure 3:
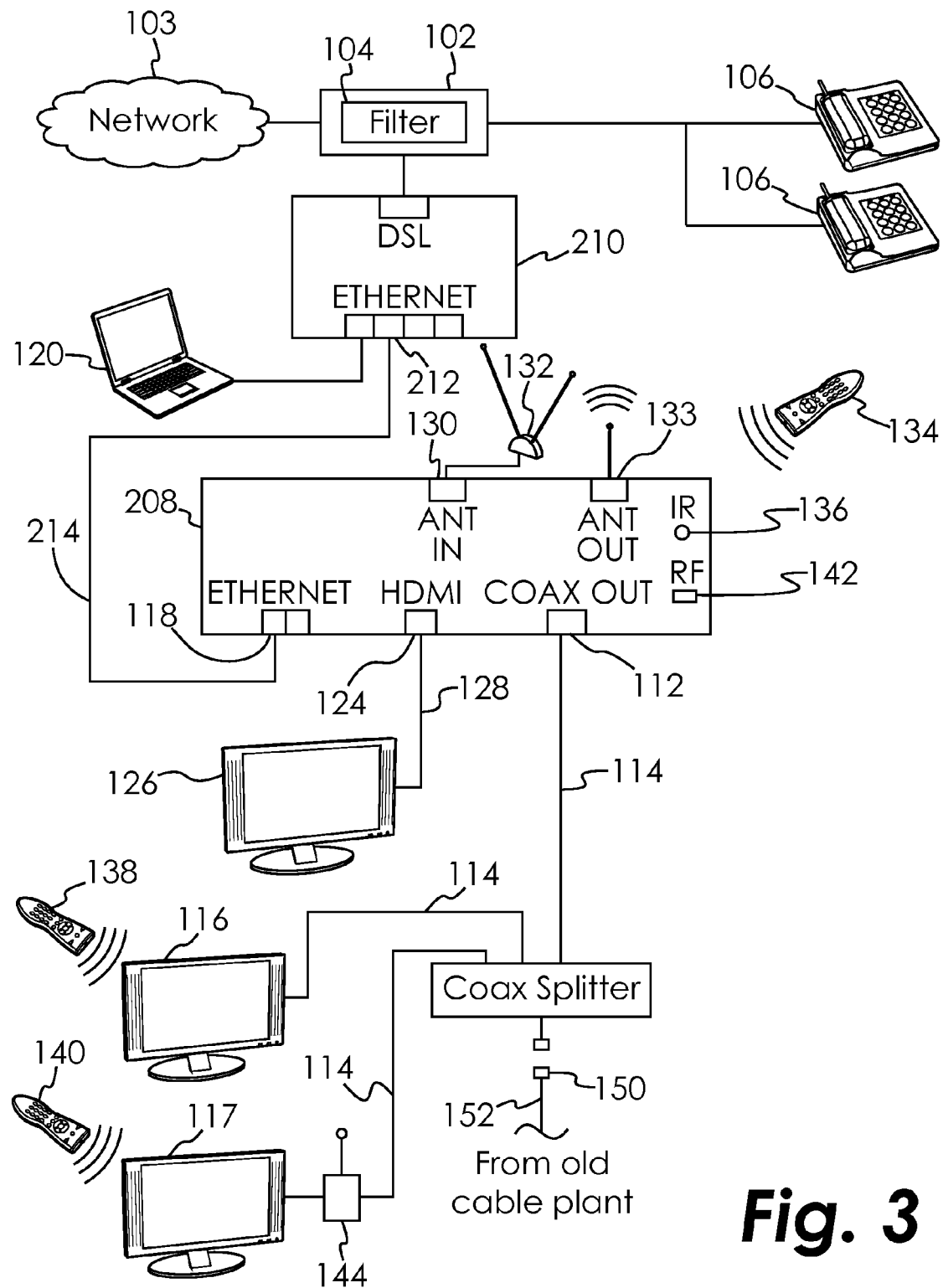
FIG. 3 is an exemplary system configured to provide digital video programming to multiple televisions within a building according to another embodiment of the present disclosure.

FIG. 3 shows a diagram of an alternative embodiment wherein the multimedia gateway of FIG. 1 is configured as a dedicated multi-television set top box 208 for use with a customer's existing residential gateway 210. The set top box 208 is connected to the peripheral components in the same fashion as multimedia gateway 108, except that the broadband signal output from network interface device 102 is first routed to a dedicated residential gateway 210, which converts the signal into an Ethernet stream. The Ethernet port 212 of the residential gateway 210 is connected to the Ethernet port 118 of the set top box 208 via a CAT-5 cable 214.

The set top box 208 has the same internal configuration as the multimedia gateway 108 of FIG. 2, except that the chipsets required to convert a raw DSL or DOCSIS broadband stream may be omitted from the network module 162, along with the port 110. The set top box 208 instead receives the IPTV programming content in an Ethernet stream from the customer's existing residential gateway 210. The Ethernet stream is received by the Ethernet module 174 and routed to the network module 162, where the MPEG (or other format) video packets are synchronized, passed to the decoder module 164, and output as an RF modulated signal as described herein above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for providing digital video signals to multiple televisions within a customer building, comprising:
    a network module for receiving a packet-based data stream containing a plurality of digital video streams;
    a processing module for extracting the digital video streams from said packet-based data stream;
    an RF modulation module for converting said digital video streams into a plurality of RF modulated channel signals;
    an Ethernet module configured to send Ethernet over coax protocol signals to an Ethernet device over a first coaxial cable;
    a single remote control module located on a single physical chip configured to;
    receive radio frequency signals through a radio frequency antenna in communication with the single remote control module, said radio frequency signals being received directly from a first radio frequency handheld remote, said first radio frequency handheld remote being operable to control a separate one of said televisions which television is physically separated from the remote control module by at least one wall;
    receive infrared signals through an infrared sensor in communication with the single remote control module, said infrared signals being received from at least one infrared handheld remote, said infrared handheld remote being operable to control a separate one of said televisions which is not physically separated from the remote control module by a wall; and
    receive radio frequency signals from a second radio frequency handheld remote, said second radio frequency handheld remote being operable to control a separate one of said televisions which television is physically separated from the remote control module by at least one wall and wherein the radio frequency 27 signals from the second radio frequency handheld remote are transmitted directly 28 to a radio frequency repeater and the radio frequency signals are then transmitted 29 from the radio frequency repeater to the remote control module over one of the first or a second coaxial cable;
    an ATSC tuner module in communication with an RF bypass module providing for a user to bypass the output of the RF modulator and receive broadcast signals on at least one of said televisions within a customer building;
    wherein the device is configured to transmit said plurality of RF modulated channel signals to at least one of said televisions within a customer building;
    wherein one or more of said televisions may be tuned to receive at least one of said RF modulated channel signals; and
    wherein one or more of said televisions may be tuned to receive a broadcast signal through said ATSC tuner module and said RF bypass module.

2. The device of claim 1, wherein said plurality of RF modulated channel signals are transmitted over a coaxial cable system from the device to said televisions.

3. The device of claim 1, wherein said plurality of RF modulated channel signals are transmitted over the air from the device to said televisions.

4. The device of claim 1, wherein at least one of said plurality of RF modulated channel signals are transmitted to said televisions in an ATSC format.

5. The device of claim 1, wherein at least one of said plurality of RF modulated signals are transmitted to said televisions in an NTSC format.

6. The device of claim 1, further comprising an HDMI interface for connection to one of said televisions, said one of said televisions being associated with said infrared based handheld remote.

7. The device of claim 1, wherein said packet-based data stream is based on a DSL family protocol.

8. The device of claim 1, wherein said packet-based data stream is based on a DOCSIS protocol.

9. The device of claim 1, wherein said packet-based data stream is based on an Ethernet protocol.

10. The device of claim 1, wherein said device is configured to function as a residential gateway and a set top box for multiple televisions.

11. The device of claim 1, wherein said device is configured to receive said digital video streams from a separate residential gateway.

12. A method for providing digital video services to a plurality of televisions in a customer building, comprising the steps of:
    receiving a packet-based data stream into a multimedia gateway, said packet-based data stream including a plurality of digital video streams;
    extracting a first digital video stream from said packet-based data stream;
    converting said first digital video stream into a first RF modulated channel signal;
    transmitting said first RF modulated channel signal from said multimedia gateway to a first television;
    receiving an ATSC media signal at an ATSC tuner in communication with an RF bypass module within the multimedia gateway;
    transmitting said ATSC media signal from said multimedia gateway to a second television;
    sending Ethernet over coax protocol signals from the multimedia gateway over a first coaxial cable to an Ethernet device; and receiving remote control signals from multiple remote controls at a single remote control module located on a single physical chip associated with the multimedia gateway, wherein the remote control module is configured to;
  receive radio frequency signals through a radio frequency antenna in communication with the single remote control module, said radio frequency signals being received directly from a first radio frequency handheld remote, said first radio frequency handheld remote being operable to control a separate one of said televisions which television is physically separated from the remote control module by at least one wall;
  receive infrared signals through an infrared sensor in communication with the single remote control module, said infrared signals being received from at least one infrared handheld remote, said infrared handheld remote being operable to control a separate one of said televisions which is not physically separated from the remote control module by a wall; and
 receive radio frequency signals from a second radio frequency handheld remote, said second radio frequency handheld remote being operable to control a separate one of said televisions which television is physically separated from the remote control module by at least one wall and wherein the radio frequency signals from the second radio frequency handheld remote are transmitted directly to a radio frequency repeater and the radio frequency signals are then transmitted from the radio frequency repeater to the remote control module over one of the first or a second coaxial cable.

13. The method of claim 12, wherein said first RF modulated channel signal is an ATSC signal.

14. The method of claim 12, wherein said first RF modulated channel signal is transmitted over a coaxial cable system to said first television.

15. The method of claim 12, wherein said first RF modulated channel signal is transmitted over the air to said first television.

16. The method of claim 12, further comprising the steps of:
  extracting a second digital video stream from said packet-based data stream;
  converting said second digital video stream into a second RF modulated channel signal;
  transmitting said second RF modulated channel signal to a second television;
  wherein said first RF modulated channel signal and said second RF modulated channel signal are transmitted at different frequencies.

17. The method of claim 16, wherein said first RF modulated channel signal and said second RF modulated channel signal are ATSC signals.

18. The method of claim 16, wherein said first RF modulated channel signal is an ATSC signal and said second RF modulated channel signal is an NTSC signal.

19. The method of claim 12, wherein said packet-based data stream is based on a DSL family protocol.

20. The method of claim 12, wherein said packet-based data stream is based on a DOCSIS protocol.

21. A method for providing digital video services to a plurality of televisions in a customer building, comprising the steps of:
  receiving a packet-based data stream into a set top box, said packet-based data stream including a plurality of video content streams;
  extracting a first video content stream from said packet-based data stream;
  converting said first video content stream into a first RF modulated channel signal;
  transmitting said first RF modulated channel signal from said set top box to a first television;
  receiving an ATSC media signal at an ATSC tuner in communication with an RF bypass module within the set top box;
  transmitting said ATSC media signal from said set top box to a second television;
  sending Ethernet over coax protocol signals from the set top box over a first coaxial cable to an Ethernet device; and
  receiving remote control signals from multiple remote controls at a single remote control module located on a single physical chip associated with the set top box, wherein the remote control module is configured to;
  receive radio frequency signals through a radio frequency antenna in communication with the single remote control module, said radio frequency signals being received directly from a first radio frequency handheld remote, said first radio frequency handheld remote being operable to control a separate one of said televisions which television is physically separated from the remote control module by at least one wall;
  receive infrared signals through an infrared sensor in communication with the single remote control module, said infrared signals being received from at least one infrared handheld remote, said infrared handheld remote being operable to control a separate one of said televisions which is not physically separated from the remote control module by a wall; and
  receive radio frequency signals from a second radio frequency handheld remote, said second radio frequency handheld remote being operable to control a separate one of said televisions which television is physically separated from the remote control module by at least one wall and wherein the radio frequency signals from the second radio frequency handheld remote are transmitted directly to a radio frequency repeater and the radio frequency signals are then transmitted from the radio frequency repeater to the remote control module over one of the first or a second coaxial cable.

22. The method of claim 21, wherein said first RF modulated channel signal is an ATSC signal.

23. The method of claim 21, wherein said first RF modulated channel signal is transmitted over a coaxial cable system to said first television.

24. The method of claim 21, wherein said first RF modulated channel signal is transmitted over the air to said first television.

25. The method of claim 21, further comprising the steps of:
  extracting a second digital video stream from said packet-based data stream;
  converting said second digital video stream into a second RF modulated channel signal;
  transmitting said second RF modulated channel signal to a second television;
  wherein said first RF modulated channel signal and said second RF modulated channel signal are transmitted at different frequencies.

26. The method of claim 25, wherein said first RF modulated signal and said second RF modulated signal are ATSC signals.

27. The method of claim 25, wherein said first RF modulated signal is an ATSC signal and said second RF modulated signal is an NTSC signal.

28. The device of claim 21, wherein said packet-based data stream is based on an Ethernet protocol.

\* \* \* \* \*